United States Patent
Awad Alla et al.

(10) Patent No.: US 10,838,416 B1
(45) Date of Patent: Nov. 17, 2020

(54) VEHICLE CONTROL HANDOFF

(71) Applicant: Ford Global Technologies, LLC, Dearbron, MI (US)

(72) Inventors: Michael Adel Awad Alla, Novi, MI (US); Barnabas J. Nemec, Dearborn, MI (US); Tsung-Han Tsai, Ypsilanti, MI (US); Vivekananda Krishnamurthy, Belleville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 54 days.

(21) Appl. No.: 16/426,661

(22) Filed: May 30, 2019

(51) Int. Cl.
*G05D 1/00* (2006.01)
*G06K 9/00* (2006.01)
*G08G 1/00* (2006.01)

(52) U.S. Cl.
CPC ......... *G05D 1/0061* (2013.01); *G05D 1/0011* (2013.01); *G06K 9/00838* (2013.01); *G08G 1/207* (2013.01); *G05D 2201/0213* (2013.01)

(58) Field of Classification Search
CPC ............... G05D 1/0061; G05D 1/0011; G05D 2201/0213; G08G 1/207; G06K 9/00838
See application file for complete search history.

(56) References Cited

U.S. PATENT DOCUMENTS

| | | | |
|---|---|---|---|
| 9,215,274 B2 | 12/2015 | Penilla et al. | |
| 9,950,722 B2 | 4/2018 | Kumar et al. | |
| 2011/0063138 A1* | 3/2011 | Berkobin | B60R 25/1004 340/988 |
| 2018/0011485 A1 | 1/2018 | Ferren | |
| 2018/0096609 A1 | 4/2018 | de la Cruz et al. | |
| 2018/0284759 A1* | 10/2018 | Michalakis | G05D 1/0061 |
| 2018/0304836 A1 | 10/2018 | DeCia et al. | |
| 2019/0025825 A1* | 1/2019 | Takahama | B60W 60/0053 |
| 2019/0108757 A1 | 4/2019 | Watanabe | |

* cited by examiner

*Primary Examiner* — Rodney A Butler
(74) *Attorney, Agent, or Firm* — Frank A. MacKenzie; Bejin Bieneman PLC

(57) ABSTRACT

A computer includes a processor and a memory storing instructions executable by the processor to, upon determining that a vehicle entered a geofenced area, start a timer; upon determining that a handoff of the vehicle from an operator to a remote server has not occurred since starting the timer and that the timer has exceeded a time threshold, determine whether the operator is absent based on data from sensors; and then, upon determining that the operator is absent, instruct the vehicle to follow a command received from the remote server.

13 Claims, 5 Drawing Sheets

VEHICLE CONTROL HANDOFF

BACKGROUND

Vehicles can be autonomous, semi-autonomous, or non-autonomous, and may be capable of operating in each of a nonautonomous or semi-autonomous mode in addition to an autonomous mode at various times. For autonomous or semi-autonomous modes, a computer can be programmed to operate the vehicle independently of the intervention of a human driver, completely or to a lesser degree. The computer is programmed to operate the propulsion, brake system, steering, and/or other vehicle systems. In an autonomous mode, the computer controls the propulsion, brake system, and steering without input from a human driver; in a semi-autonomous mode, the computer controls one or two of the propulsion, brake system, and steering and a human driver controls the remainder; and in a nonautonomous mode, a human driver controls the propulsion, brake system, and steering.

DETAILED DESCRIPTION

Figure 1:
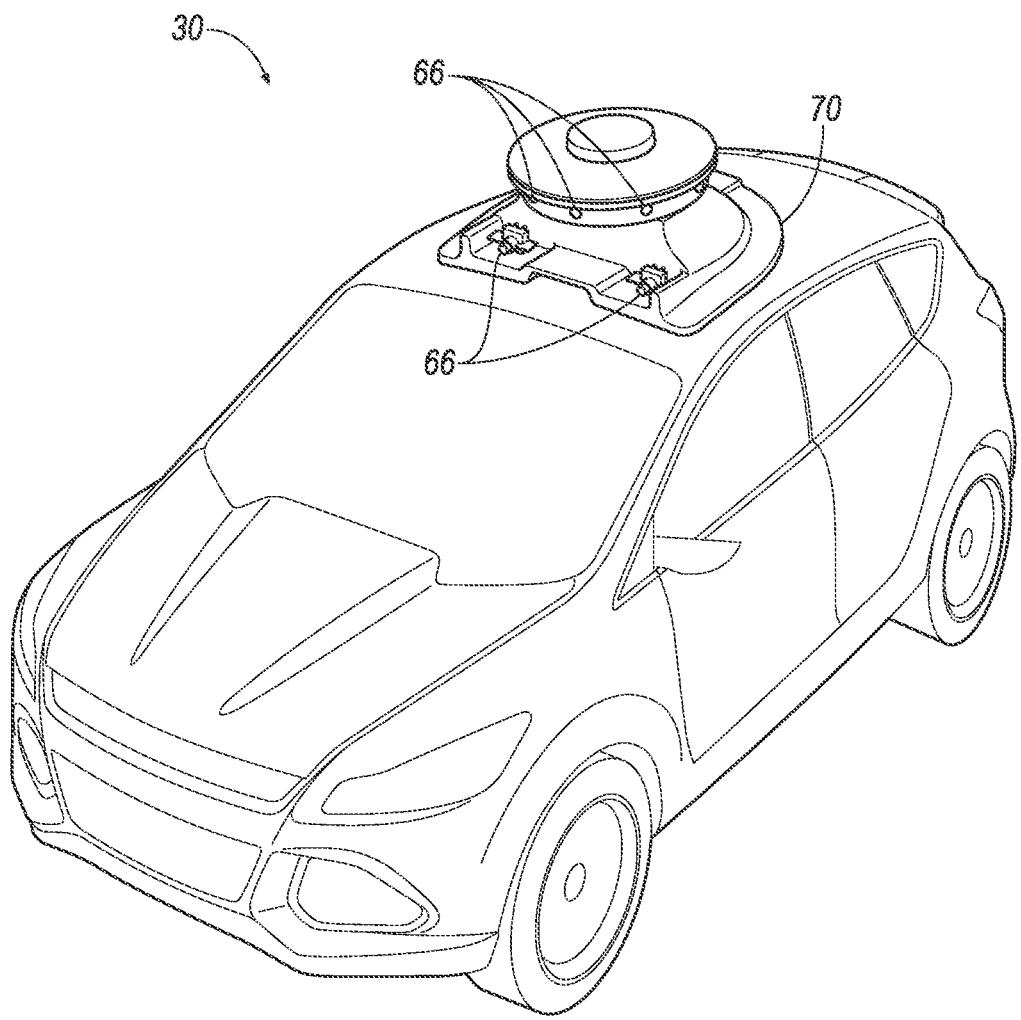
FIG. 1 is a perspective view of an example vehicle.

The system described below provides an efficient mechanism to switch a vehicle from manual mode to autonomous mode and to switch control from an operator near the vehicle to a remote server potentially far from the vehicle. Efficiently switching between modes and control of the vehicle allows more efficient use of the vehicle and decreases downtime. The system provides a robust way to detect the operator of the vehicle to either potentially continue receiving commands from the operator or to switch to receiving commands from a remote server.

The system includes a computer including a processor and a memory. The memory stores instructions executable by the processor such that the computer is programmed to, upon determining that a vehicle entered a geofenced area, start a timer; upon determining that a handoff of the vehicle from an operator to a remote server has not occurred since starting the timer and that the timer has exceeded a time threshold, determine whether the operator is absent based on data from sensors; and then, upon determining that the operator is absent, instruct the vehicle to follow a command received from the remote server.

The sensors may include at least one sensor having a field of view in a passenger cabin of the vehicle.

The sensors may include at least one sensor having a field of view outside the vehicle.

The sensors may include at least one short-range wireless transceiver.

Following the command from the remote server may include operating the vehicle in an autonomous mode.

The computer may be programmed to prevent the vehicle from operating in an autonomous mode when outside the geofenced area.

The computer may be programmed to, upon determining that the handoff has occurred, instruct the vehicle to follow the command received from the remote server.

The computer may be programmed to, upon determining that the handoff has not occurred since starting the timer and that the timer has exceeded the time threshold, transmit a message that the vehicle is idle.

The handoff may be a transmission to the remote server from a device associated with the operator.

A system includes means for detecting an operator of a vehicle, means for determining that the vehicle is in a geofenced area, and a computer. The computer is programmed to, upon determining that the vehicle entered the geofenced area, start a timer; upon determining that a handoff of the vehicle from the operator to a remote server has not occurred since starting the timer and that the timer has exceeded a time threshold, determine whether the operator is absent using the means for detecting the operator; and then, upon determining that the operator is absent, instruct the vehicle to follow a command received from the remote server.

The means for detecting the operator of the vehicle may include means for detecting the operator inside a passenger cabin of the vehicle.

The means for detecting the operator of the vehicle may include means for detecting the operator outside the vehicle.

A method includes, upon determining that a vehicle entered a geofenced area, starting a timer; upon determining that a handoff of the vehicle from an operator to a remote server has not occurred since starting the timer and that the timer has exceeded a time threshold, determining whether the operator is present based on data from sensors of the vehicle; and then, upon determining that the operator is absent, instructing the vehicle to follow a trip received from the remote server.

With reference to the Figures, a computer 32 includes a processor and a memory storing instructions executable by the processor to, upon determining that a vehicle 30 entered a geofenced area 34, start a timer; upon determining that a handoff of the vehicle 30 from an operator 36 to a remote server 38 has not occurred since starting the timer and that the timer has exceeded a time threshold, determine whether the operator 36 is absent based on data from sensors 60; and then, upon determining that the operator 36 is absent, instruct the vehicle 30 to follow a command received from the remote server 38.

With reference to FIG. 1, the vehicle 30 may be any passenger or commercial automobile such as a car, a truck, a sport utility vehicle, a crossover, a van, a minivan, a taxi, a bus, etc.

Figure 2:
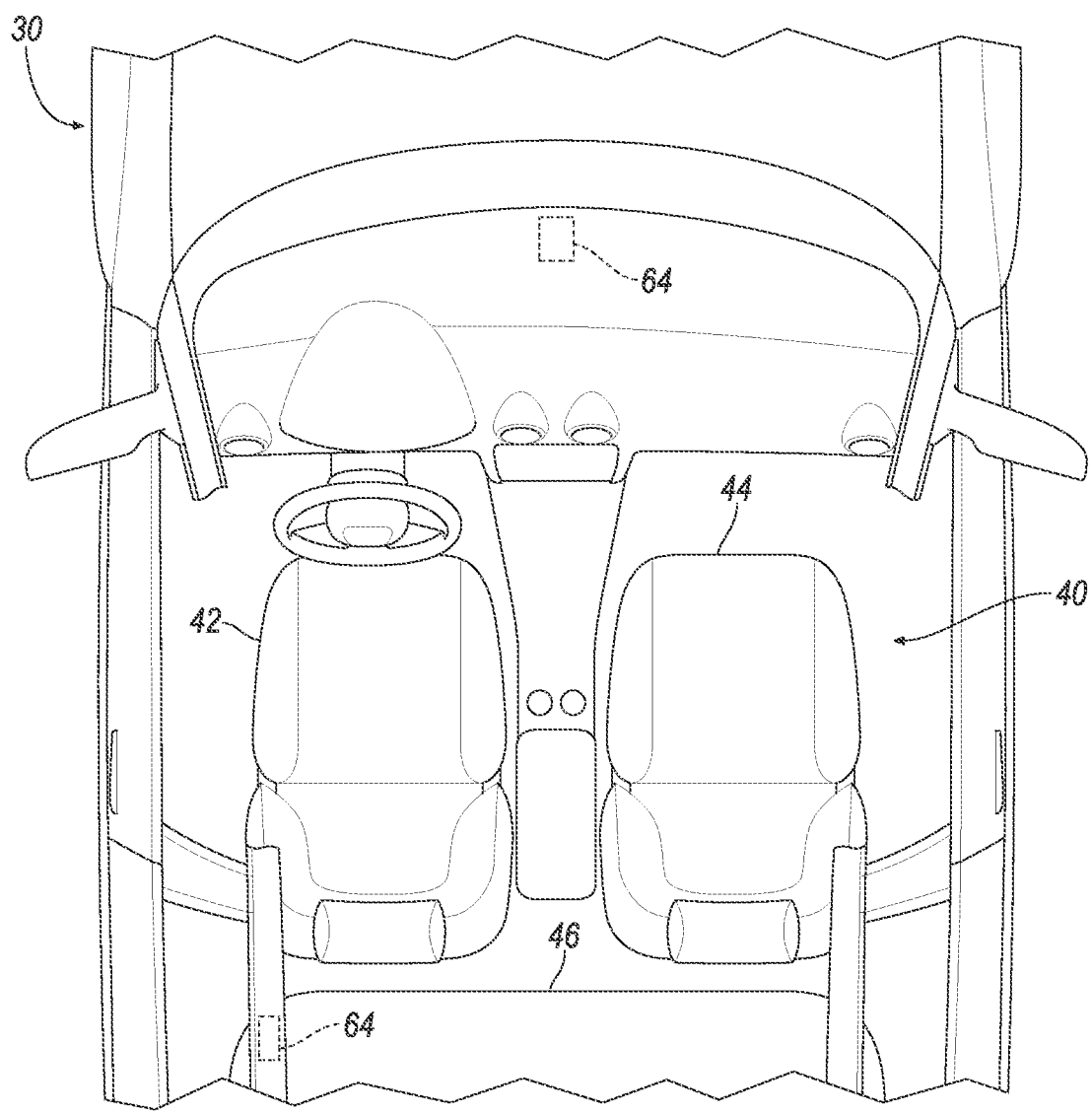
FIG. 2 is a top view of the vehicle with a passenger cabin exposed for illustration.

With reference to FIG. 2, the vehicle 30 includes a passenger cabin 40 to house occupants, if any, of the vehicle 30, such as the operator 36. The passenger cabin 40 includes a driver seat 42 and a passenger seat 44 disposed at a front of the passenger cabin 40 and one or more back seats 46 disposed behind the driver seat 42 and passenger seat 44. The passenger cabin 40 may also include third-row seats (not shown) at a rear of the passenger cabin 40. In FIG. 2, the driver seat 42 and passenger seat 44 are shown to be bucket seats and the back seats 46 are shown to be bench seats, but the seats 42, 44, 46 may be other types. The position and orientation of the seats 42, 44, 46 and components thereof may be adjustable by an occupant.

Figure 3:
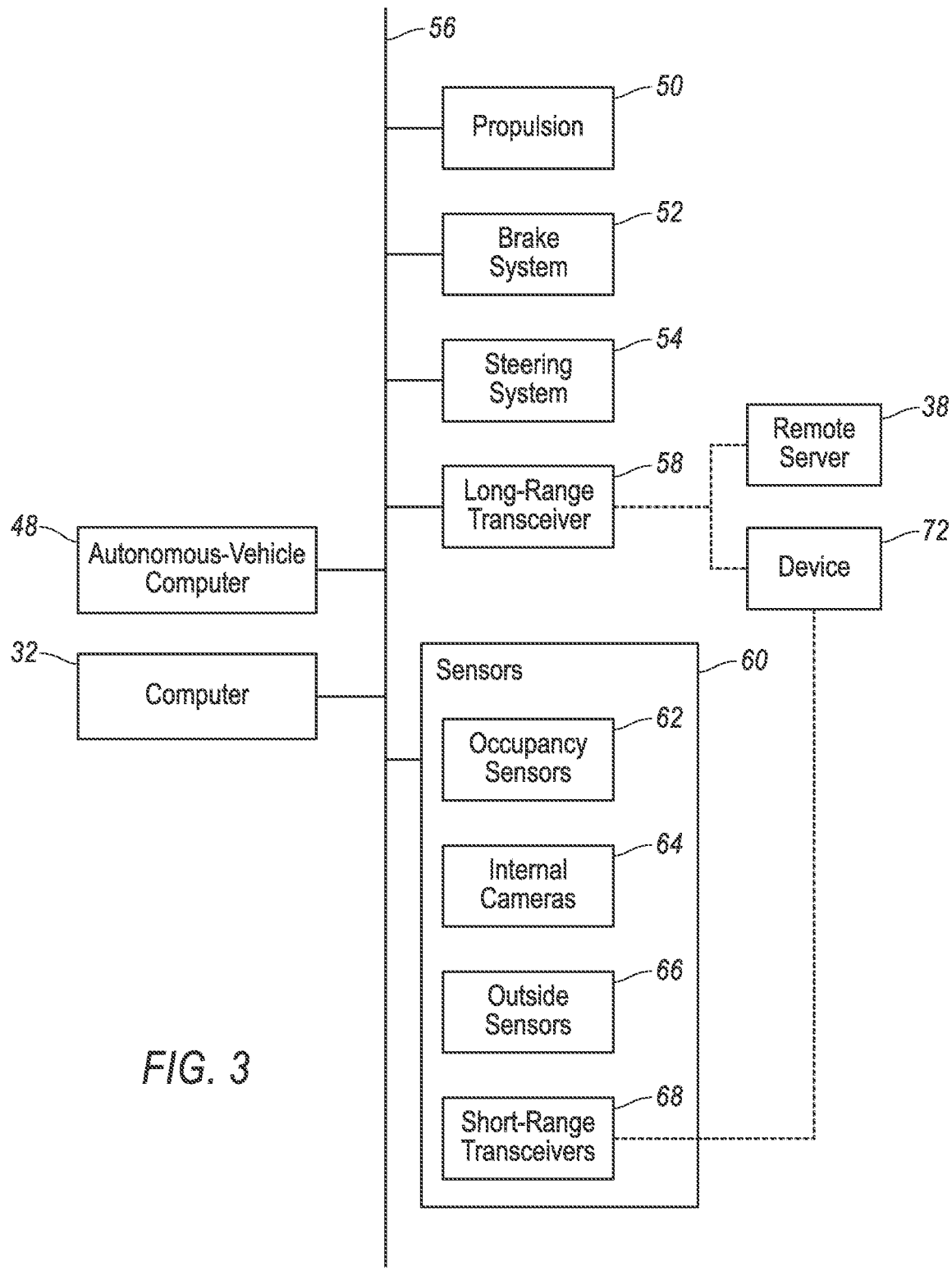
FIG. 3 is a block diagram of the vehicle.

With reference to FIG. 3, the vehicle 30 may be an autonomous vehicle. An autonomous-vehicle computer 48 can be programmed to operate the vehicle 30 independently of the intervention of a human driver such as the operator 36, completely or to a lesser degree. The autonomous-vehicle computer 48 may be programmed to operate a propulsion 50, a brake system 52, a steering system 54, and/or other vehicle systems. For the purposes of this disclosure, an autonomous mode means the autonomous-vehicle computer 48 controls the propulsion 50, brake system 52, and steering system 54 without input from the operator 36; a semi-autonomous mode means the autonomous-vehicle computer 48 controls one or two of the propulsion 50, brake system 52, and steering system 54 and the operator 36 controls the remainder; and a manual mode means the operator 36 controls the propulsion 50, brake system 52, and steering system 54.

The autonomous-vehicle computer 48 is a microprocessor-based computer. The autonomous-vehicle computer 48 includes a processor, memory, etc. The memory of the autonomous-vehicle computer 48 includes memory for storing instructions executable by the processor as well as for electronically storing data and/or databases.

The computer 32 is one or more microprocessor-based computers. The computer 32 includes memory, at least one processor, etc. The memory of the computer 32 includes memory for storing instructions executable by the processor as well as for electronically storing data and/or databases. The computer 32 may be the same computer as the autonomous-vehicle computer 48, or the computer 32 may be one or more separate computers in communication with the autonomous-vehicle computer 48 via a communications network 56, or the computer 32 may encompass multiple computers including the autonomous-vehicle computer 48. As a separate computer, the computer 32 may be or include, e.g., one or more electronic control units or modules (ECU or ECM). The computer 32 may be located on the vehicle 30 or be remote to the vehicle 30.

The computer 32 may transmit and receive data through the communications network 56 such as a controller area network (CAN) bus, Ethernet, WiFi, Local Interconnect Network (LIN), onboard diagnostics connector (OBD-II), and/or by any other wired or wireless communications network. The computer 32 may be communicatively coupled to the autonomous-vehicle computer 48, the propulsion 50, the brake system 52, the steering system 54, a long-range transceiver 58, sensors 60, and other components via the communications network 56.

The propulsion 50 of the vehicle 30 generates energy and translates the energy into motion of the vehicle 30. The propulsion 50 may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion 50 can include an electronic control unit (ECU) or the like that is in communication with and receives input from the autonomous-vehicle computer 48 and/or the operator 36. The operator 36 may control the propulsion 50 via, e.g., an accelerator pedal and/or a gearshift lever.

The brake system 52 is typically a conventional vehicle braking subsystem and resists the motion of the vehicle 30 to thereby slow and/or stop the vehicle 30. The brake system 52 may include friction brakes such as disc brakes, drum brakes, band brakes, etc.; regenerative brakes; any other suitable type of brakes; or a combination. The brake system 52 can include an electronic control unit (ECU) or the like that is in communication with and receives input from the autonomous-vehicle computer 48 and/or the operator 36. The operator 36 may control the brake system 52 via, e.g., a brake pedal.

The steering system 54 is typically a conventional vehicle steering subsystem and controls the turning of the wheels. The steering system 54 may be a rack-and-pinion system with electric power-assisted steering, a steer-by-wire system, as both are known, or any other suitable system. The steering system 54 can include an electronic control unit (ECU) or the like that is in communication with and receives input from the autonomous-vehicle computer 48 and/or the operator 36. The operator 36 may control the steering system 54 via, e.g., a steering wheel.

The long-range transceiver 58 is adapted to transmit signals wirelessly through any suitable wireless communication protocol, such as Bluetooth®, WiFi, IEEE 802.11a/b/g, other RF (radio frequency) communications, etc. For the purposes of this disclosure, a device is "long-range" if the device is capable of transmitting wirelessly over distances greater than 100 meters. The long-range transceiver 58 may be adapted to communicate with the remote server 38, that is, a server distinct and spaced from the vehicle 30. The remote server 38 may be located outside the vehicle 30. For example, the remote server 38 may be associated with other vehicles (e.g., V2V communications), infrastructure components (e.g., V2I communications via Dedicated Short-Range Communications (DSRC) or the like), emergency responders, a device 72 associated with the operator 36 of the vehicle 30, etc. The long-range transceiver 58 may be one device or may include a separate transmitter and receiver.

The sensors 60 of the vehicle 30 include occupancy sensors 62, internal cameras 64, outside sensors 66, short-range wireless transceivers 68, and other sensors.

The occupancy sensors 62 are configured to detect occupancy of the seats 42, 44, 46. The occupancy sensors 62 may be weight sensors inside the seats 42, 44, 46, sensors detecting whether seatbelts for the seats 42, 44, 46 are buckled or unspooled, or other suitable sensors.

The internal cameras 64 each have a field of view in the passenger cabin 40, e.g., of one or more of the seats 42, 44, 46. For example, as shown in FIG. 2, one of the internal cameras 64 can be mounted on a dashboard or windshield facing rearward toward the driver seat 42. Other internal cameras 64 can be directed to each row of the seats 42, 44, 46. The internal cameras 64 can be any suitable type of image processing device, e.g., visible-light camera, grayscale camera, infrared camera, etc.

The outside sensors 66 detect the external world, e.g., objects and/or characteristics of surroundings of the vehicle 30, such as other vehicles, road lane markings, traffic lights and/or signs, pedestrians, etc. For example, the outside sensors 66 can include radar sensors, scanning laser range finders, light detection and ranging (LIDAR) devices, and image processing sensors such as cameras. The outside sensors 66 are mounted on the vehicle 30 and have fields of view outside the vehicle 30. For example, as shown in FIG. 1, the outside sensors 66 may be mounted in a housing 70 on a roof of the vehicle 30.

The short-range wireless transceivers 68 are adapted to transmit signals wirelessly through any suitable wireless communication protocol, such as Bluetooth®, WiFi, IEEE 802.11a/b/g, other RF (radio frequency) communications, etc. For the purposes of this disclosure, a device is "short-range" if the device cannot reliably transmit wirelessly over distances greater than 100 meters. The short-range wireless transceivers 68 may be adapted to communicate with a remote device, that is, a device distinct and spaced from the vehicle 30. The remote device may be located outside the vehicle 30. For example, the remote device may be associated with other vehicles (e.g., V2V communications), infrastructure components (e.g., V2I communications via Dedicated Short-Range Communications (DSRC) or the like), emergency responders, the device 72 associated with the operator 36 of the vehicle 30, etc. The short-range wireless transceivers 68 may each be one device or may include a separate transmitter and receiver.

For example, the short-range wireless transceivers 68 can be a plurality of Bluetooth Low Energy (BLE) sensors. Each BLE sensor emits a signal that can be detected by a mobile device such as a cellular phone, e.g., the device 72 associated with the operator 36. The signal may include a location of the BLE sensor relative to the vehicle 30. The device 72 can approximate a distance to the BLE sensor by measuring the signal strength of the signal from the BLE sensor. Using the locations of and the approximate distances to the BLE sensors, the device 72 can determine its location relative to the vehicle 30 using conventional triangulation techniques, and the device 72 can send that location to the computer 32 via the long-range transceiver 58. The triangulation may be in two horizontal dimensions. Alternatively, the device 72 can transmit the signal strengths or approximate distances to the BLE sensors to the computer 32 via the long-range transceiver 58, and the computer 32 can then determine a location of the device 72 relative to the vehicle 30 by triangulation.

The sensors 60 can include other types of sensors besides the types specifically listed. For example, the sensors 60 may provide data about operation of the vehicle 30, for example, wheel speed, wheel orientation, and engine and transmission data (e.g., temperature, fuel consumption, etc.). The sensors 60 may detect the location and/or orientation of the vehicle 30. For example, the sensors 60 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers.

Figure 4:
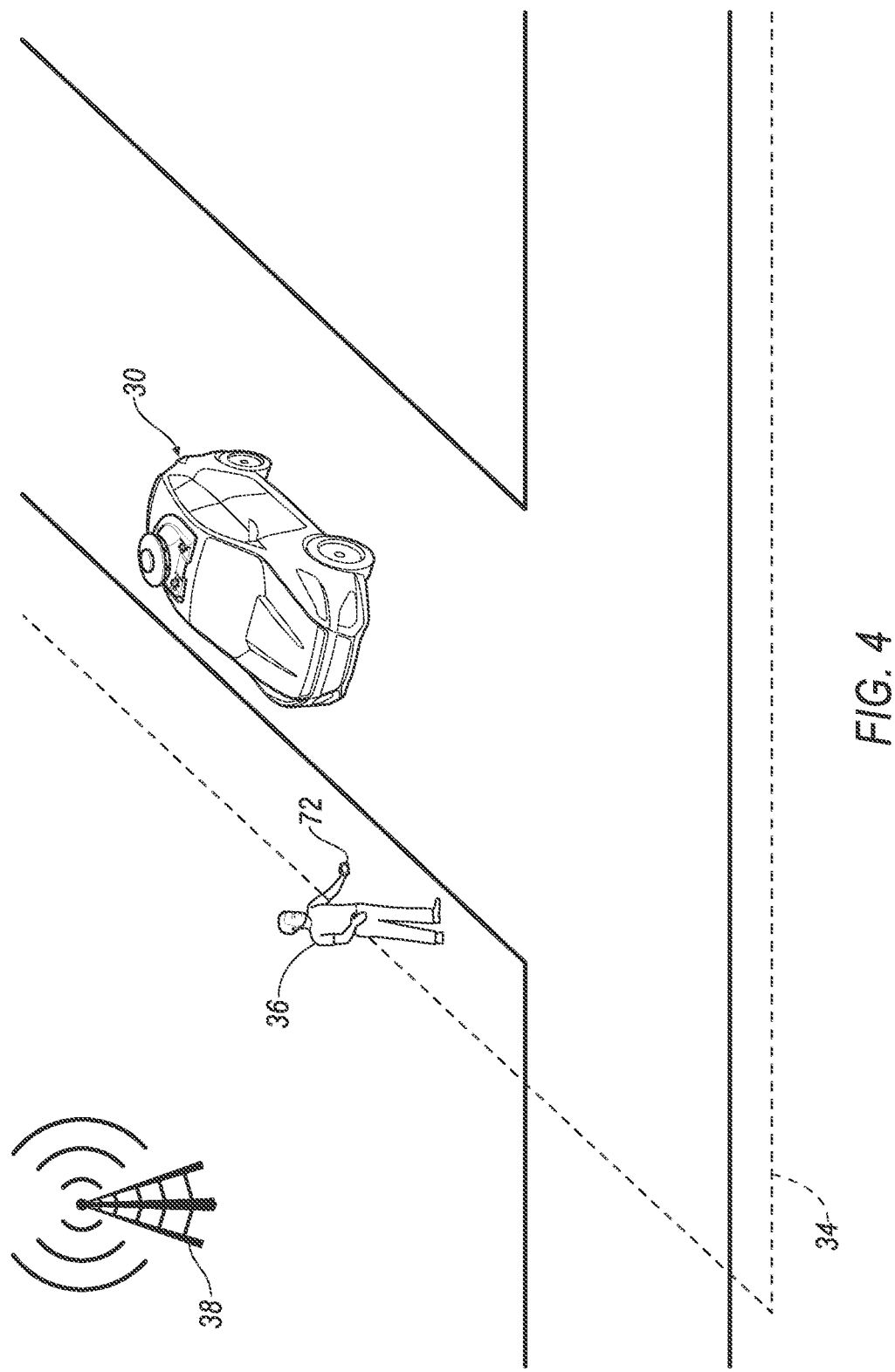
FIG. 4 is a diagram of the vehicle with an operator and a geofenced area.

With reference to FIG. 4, in one example use case, the operator 36 drives the vehicle 30 to a target location inside the geofenced area 34, leaves the vehicle 30, and performs a handoff of the vehicle 30 to the remote server 38 using the device 72. The remote server 38 then transmits a command to the vehicle 30, and the vehicle 30 autonomously follows the command. For the purposes of this disclosure, an "operator" is a human being controlling the vehicle 30; and a "geofenced area" is a geographic region enclosed by a virtual boundary, i.e., an artificial border. The virtual boundary of the geofenced area 34 can be stored in the memory of the computer 32, e.g., as a series of interconnected geographical coordinates. The device 72 associated with the operator 36 can be, e.g., a dedicated remote-control device for the vehicle 30, a mobile phone, or any other electronic device able to transmit messages related to controlling the vehicle 30, e.g., to the long-range transceiver 58. The handoff is a transmission to the remote server 38 from the device 72 notifying the remote server 38 that the vehicle 30 is available to receive a command. The command can include one or more locations to which the vehicle 30 is instructed to travel, and can also include other conditions or requirements associated with the locations, e.g., waiting for a period of time at a location for a passenger before leaving to travel to a different location. The remote server 38 can be associated with a service that operates the vehicle 30 and other similar vehicles.

Figure 5:
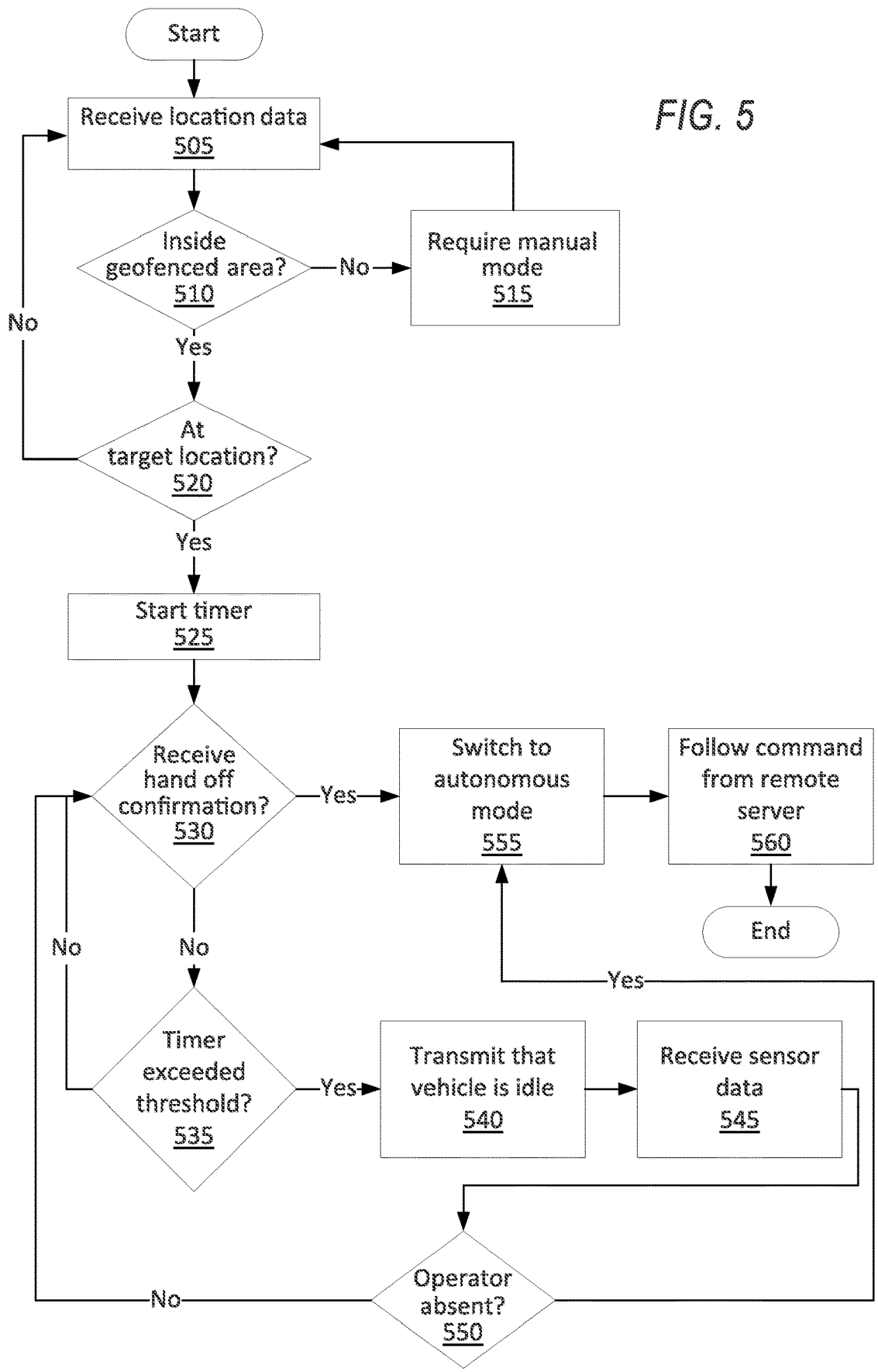
FIG. 5 is a process flow diagram of an example process for controlling the vehicle.

FIG. 5 is a process flow diagram illustrating an exemplary process 500 for controlling the vehicle 30. The memory of the computer 32 stores instructions executable by a processor of the computer 32 for performing the steps of the process 500. The computer 32 performing the process 500 may be located on the vehicle 30, or the computer 32 may be located remotely, e.g., at the remote server 38, and in communication with the vehicle 30 via the long-range transceiver 58. As a general overview of the process 500, once the vehicle 30 enters the geofenced area 34, the vehicle 30 switches to an autonomous mode and follows the command from the remote server 38 if either the handoff is confirmed or if a timer exceeds a time threshold and the operator 36 is absent from in and around the vehicle 30.

The process 500 begins in a block 505, in which the computer 32 receives location data, e.g., GPS or local coordinates, of the vehicle 30. The location data may be received from, e.g., GPS sensors of the sensors 60.

Next, in a decision block 510, the computer 32 determines whether the vehicle 30 has entered the geofenced area 34. The computer 32 has the geofenced area 34 stored in memory and determines whether the location data indicates that the vehicle 30 is located inside the geofenced area 34. Upon determining that the vehicle 30 is not in the geofenced area 34, the process 500 proceeds to a block 515. Upon determining that the vehicle 30 is in the geofenced area 34, the process 500 proceeds to a decision block 520.

In the block 515, the computer 32 requires the autonomous-vehicle computer 48 to operate the vehicle 30 in a manual mode. In other words, the computer 32 prevents the vehicle 30 from operating in an autonomous mode when outside the geofenced area 34. After the block 515, the process 500 returns to the block 505 to continue monitoring the location data to determine when the vehicle 30 enters the geofenced area 34.

In the decision block 520, the computer 32 determines whether the vehicle 30 is at a target location. The target location may be a location transmitted from the remote server 38 to the vehicle 30 at which the handoff should occur, and the computer 32 may compare the location data to the target location. Alternatively or additionally, the target location may be transmitted from the remote server 38 to the device 72, and the computer 32 may determine that the vehicle 30 is at the target location by the operator 36 providing an input, e.g., shutting off the propulsion 50 of the vehicle 30. If the vehicle 30 is not at the target location, the process 500 returns to the block 505 to continue monitoring the location data to determine when the vehicle 30 arrives at the target location. If the vehicle 30 is at the target location, the process 500 proceeds to a block 525.

In the block 525, the computer 32 starts a timer. The timer can be, e.g., a timekeeping subroutine in the computer 32 that counts upward from a starting value of zero.

Next, in a decision block 530, the computer 32 determines whether the handoff of the vehicle 30 from the operator 36 to the remote server 38 has occurred. If the computer 32 is located at the remote server 38, the computer 32 checks whether the handoff was received from the device 72. If the computer 32 is located at the vehicle 30, the computer 32 checks whether a confirmation message was received from the remote server 38 indicating that the remote server 38 received the handoff from the device 72. Upon determining that the handoff has not occurred since starting the timer, the process 500 proceeds to a decision block 535. Upon determining that the handoff has occurred, the process 500 proceeds to a block 555.

In the decision block 535, the computer 32 determines whether the timer has exceeded a time threshold. The time threshold is a value measured in units of time, e.g., seconds, stored in the memory of the computer 32. The time threshold can be chosen by, e.g., experimentally determining a range of times that operators 36 typically take to perform handoffs upon arriving at target locations, and selecting a time at the upper end of that range of times. If the timer has not exceeded the threshold, the process 500 returns to the decision block 530 to continue waiting for the handoff. If the timer has exceeded the threshold, the process proceeds to a block 540.

In the block 540, the computer 32 transmits a message that the vehicle 30 is idle, i.e., is not being controlled by the operator 36 and does not have a command assigning tasks to the vehicle 30. If the computer 32 is located in the vehicle 30, the message is transmitted to the remote server 38. If the computer 32 is located at the remote server 38, the message is transmitted to a module, i.e., another computer at the remote server 38 or another application being run on the same computer 32, responsible for assigning commands to vehicles such as the vehicle 30.

Next, in a block 545, the computer 32 receives sensor data from the sensors 60. The sensor data can include binary or numerical data from the occupancy sensors 62, image data from the internal cameras 64, image data or data to build a three-dimensional model of the external environment from the outside sensors 66, and/or distance data and identifying data from the short-range wireless transceivers 68.

Next, in a decision block 550, the computer 32 determines whether the operator 36 is absent based on the data from the sensors 60. For example, the computer 32 can determine that the operator 36 is absent if the data from the occupancy sensors 62 indicate that the driver seat 42 or all the seats 42, 44, 46 are unoccupied, the data from the internal cameras 64 indicate no object recognized as the operator 36, the outside sensors 66 indicate no object recognized as the operator 36, and no signal-strength data emitted by the short-range wireless transceivers 68 is sent back by the device 72 associated with the operator 36; alternatively, the computer 32 can determine that the operator 36 is absent from sensor data from a subset of the occupancy sensors 62, the internal cameras 64, the outside sensors 66, and the short-range wireless transceivers 68.

The computer 32 can perform conventional object-recognition on the data from the internal cameras 64 and the outside sensors 66 to recognize an object, e.g., a person. Data representing people in various orientations may be stored in the memory of the computer 32 as baseline data for the computer 32 to compare to the data received from the internal cameras 64 and the outside sensors 66. The operator 36 may wear, e.g., distinctive clothing and/or clothing with a pattern or code on which an object-recognition program or algorithm has been trained for the computer 32 to differentiate the operator 36 from other people.

The computer 32 can determine that the operator 36 is present if the data from the occupancy sensors 62 indicate that the driver seat 42 or that one of the seats 42, 44, 46 is unoccupied, the data from the internal cameras 64 indicate an object recognized as the operator 36, the outside sensors 66 indicate an object recognized as the operator 36, or signal-strength data emitted by the short-range wireless transceivers 68 is sent back by the device 72 associated with the operator 36; alternatively, the computer 32 can determine that the operator 36 is present from sensor data from a subset of the occupancy sensors 62, the internal cameras 64, the outside sensors 66, and the short-range wireless transceivers 68.

Upon determining that the operator 36 is still present, the process 500 returns to the decision block 530 to continue waiting for the handoff. Upon determining that the operator 36 is absent, the process 500 proceeds to the block 555.

In the block 555, the vehicle 30, specifically, the autonomous-vehicle computer 48, switches from the manual mode to the autonomous mode.

Next, in a block 560, the computer 32 instructs the vehicle 30 to follow the command received from the remote server 38. The command can include one or more locations to which the vehicle 30 is instructed to travel, and can also include other conditions or requirements associated with the locations, e.g., waiting for a period of time at a location for a passenger before leaving to travel to a different location. The autonomous-vehicle computer 48 can autonomously operate the vehicle 30 to fulfill the command using the propulsion 50, the brake system 52, and the steering system 54. If the computer 32 is located at the remote server 38, the instruction to follow the command can accompany the command itself transmitted to the vehicle 30. If the computer 32 is located in the vehicle 30, the vehicle 30 can enter a mode in which the vehicle 30 will follow commands from the remote server 38. After the block 560, the process 500 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system comprising a computer including a processor and a memory, the memory storing instructions executable by the processor such that the computer is programmed to:
   upon determining that a vehicle entered a geofenced area, start a timer;
   upon determining that a handoff of the vehicle from an operator to a remote server has not occurred since starting the timer and that the timer has exceeded a time threshold, determine whether the operator is absent based on data from sensors; and
   then, upon determining that the operator is absent, instruct the vehicle to follow a command received from the remote server.

2. The system of claim 1, further comprising a sensor having a field of view in a passenger cabin of the vehicle.

3. The system of claim 1, further comprising a sensor having a field of view outside the vehicle.

4. The system of claim 1, further comprising a sensor including at least one short-range wireless transceiver.

5. The system of claim 1, wherein following the command from the remote server includes operating the vehicle in an autonomous mode.

6. The system of claim 1, wherein the computer is programmed to prevent the vehicle from operating in an autonomous mode when outside the geofenced area.

7. The system of claim 1, wherein the computer is programmed to, upon determining that the handoff has occurred, instruct the vehicle to follow the command received from the remote server.

8. The system of claim 1, wherein the computer is programmed to, upon determining that the handoff has not occurred since starting the timer and that the timer has exceeded the time threshold, transmit a message that the vehicle is idle.

9. The system of claim 1, wherein the handoff is a transmission to the remote server from a device associated with the operator.

10. A system comprising:
   means for detecting an operator of a vehicle;
   means for determining that the vehicle is in a geofenced area; and
   a computer programmed to:
      upon determining that the vehicle entered the geofenced area, start a timer;
      upon determining that a handoff of the vehicle from the operator to a remote server has not occurred since starting the timer and that the timer has exceeded a time threshold, determine whether the operator is absent using the means for detecting the operator; and
      then, upon determining that the operator is absent, instruct the vehicle to follow a command received from the remote server.

11. The system of claim 10, wherein the means for detecting the operator of the vehicle includes means for detecting the operator inside a passenger cabin of the vehicle.

12. The system of claim 10, wherein the means for detecting the operator of the vehicle includes means for detecting the operator outside the vehicle.

13. A method comprising:
- upon determining that a vehicle entered a geofenced area, starting a timer;
- upon determining that a handoff of the vehicle from an operator to a remote server has not occurred since starting the timer and that the timer has exceeded a time threshold, determining whether the operator is present based on data from sensors of the vehicle; and
- then, upon determining that the operator is absent, instructing the vehicle to follow a command received from the remote server.

\* \* \* \* \*